United States Patent
Satoh

(10) Patent No.: US 12,341,171 B2
(45) Date of Patent: Jun. 24, 2025

(54) BATTERY COOLING DEVICE

(71) Applicant: TOYOTA JIDOSHA KABUSHIKI KAISHA, Aichi-ken (JP)

(72) Inventor: Masataka Satoh, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 671 days.

(21) Appl. No.: 17/707,037

(22) Filed: Mar. 29, 2022

(65) Prior Publication Data

US 2022/0407136 A1  Dec. 22, 2022

(30) Foreign Application Priority Data

Jun. 21, 2021  (JP) .................. 2021-102327

(51) Int. Cl.
| | |
|---|---|
| *H01M 10/63* | (2014.01) |
| *H01M 10/613* | (2014.01) |
| *H01M 10/625* | (2014.01) |
| *H01M 10/633* | (2014.01) |
| *H01M 10/6552* | (2014.01) |
| *H01M 10/6556* | (2014.01) |
| *H01M 10/6568* | (2014.01) |
| *H01M 10/6569* | (2014.01) |
| *H01M 10/663* | (2014.01) |

(52) U.S. Cl.
CPC ......... *H01M 10/63* (2015.04); *H01M 10/613* (2015.04); *H01M 10/625* (2015.04); *H01M 10/633* (2015.04); *H01M 10/6552* (2015.04); *H01M 10/6556* (2015.04); *H01M 10/6568* (2015.04); *H01M 10/6569* (2015.04); *H01M 10/663* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2019/0186843 A1* | 6/2019 | Takeuchi | H01M 10/63 |
| 2019/0198954 A1* | 6/2019 | Miura | H01M 10/613 |
| 2021/0280925 A1* | 9/2021 | Yoshinori | H01M 10/6569 |

FOREIGN PATENT DOCUMENTS

| | | | | |
|---|---|---|---|---|
| JP | 2019-057429 A | 4/2019 | | |
| WO | WO-2018047535 A1 * | 3/2018 | ............. | B60K 11/02 |

* cited by examiner

*Primary Examiner* — Niki Bakhtiari
*Assistant Examiner* — Dustin Van Kirk
(74) *Attorney, Agent, or Firm* — Sughrue Mion, PLLC

(57) ABSTRACT

A battery cooling device is mounted on a vehicle and includes a thermosiphon type battery cooling circuit, a temperature control device, and an electronic control unit. The electronic control unit executes, after a circulation stop condition is satisfied, vapor phase temperature rise control for controlling the temperature control device and raising a temperature of a vapor phase side in the battery cooling circuit such that a liquid surface level of a battery cooling refrigerant reaches a level at which circulation of the battery cooling refrigerant is able to be started when the circulation of the battery cooling refrigerant is not started and the liquid surface level is not at the level at which the circulation is able to be started.

6 Claims, 8 Drawing Sheets

BATTERY COOLING DEVICE

CROSS-REFERENCE TO RELATED APPLICATION

This application claims priority to Japanese Patent Application No. 2021-102327 filed on Jun. 21, 2021, incorporated herein by reference in its entirety.

BACKGROUND

1. Technical Field

The present disclosure relates to a battery cooling device including a thermosiphon type battery cooling circuit.

2. Description of Related Art

Japanese Unexamined Patent Application Publication No. 2019-057429 (JP 2019-057429 A) discloses a thermosiphon type equipment temperature control device. This equipment temperature control device includes an equipment heat exchanger that evaporates a refrigerant to cool a battery, a condenser that condenses the refrigerant, and a fluid circulation circuit including a gas side pipe and a liquid phase side pipe. Further, the equipment temperature control device adjusts heat dissipation capacity of the condenser such that a difference between a refrigerant temperature detected by a refrigerant temperature sensor and a predetermined target refrigerant temperature becomes small.

SUMMARY

Following issues are known when a battery cooling device including a thermosiphon type battery cooling circuit described in JP 2019-057429 A is mounted on a vehicle. That is, when the vehicle moves from a low outside temperature environment to a high outside temperature environment while a battery temperature is low, and the temperature control of the condenser is started to cool a battery, circulation of a refrigerant in the battery cooling circuit may be stopped. As a result, the battery cannot be cooled, or the start of cooling the battery is delayed.

The present disclosure has been made in view of the above issues, and an object of the present disclosure is to be able to start circulation of a battery cooling refrigerant immediately when a circulation stop condition is satisfied in a battery cooling device including a thermosiphon type battery cooling circuit.

A battery cooling device according to the present disclosure is mounted on a vehicle and includes a thermosiphon type battery cooling circuit, a temperature control device, and an electronic control unit. A battery cooling refrigerant is sealed in the battery cooling circuit. The battery cooling circuit includes one or more coolers, one or more condensers, a vapor passage, and a liquid passage. The temperature control device controls a temperature of at least one of the one or more condensers. The electronic control unit controls the temperature control device.

The one or more coolers absorb heat generated by one or more battery cells and evaporates the battery cooling refrigerant in a liquid phase to cool the one or more battery cells. The one or more condensers are disposed above the one or more coolers in a vertical direction and condenses the battery cooling refrigerant in a vapor phase vaporized by the one or more coolers. The vapor passage connects between the one or more coolers and the one or more condensers and causes the battery cooling refrigerant in the vapor phase to flow through the one or more condensers. The liquid passage connects between the one or more condensers and the one or more coolers and causes the battery cooling refrigerant in the liquid phase to flow through the one or more coolers.

The electronic control unit determines whether a circulation stop condition in which there is a possibility that circulation of the battery cooling refrigerant is stopped in the battery cooling circuit is satisfied based on temperatures of the one or more battery cells and an outside air temperature when a request for cooling the one or more battery cells is made. Further, the electronic control unit executes, after the circulation stop condition is satisfied, vapor phase temperature rise control for controlling the temperature control device and raising a temperature of a vapor phase side in the battery cooling circuit such that a liquid surface level of the battery cooling refrigerant reaches a level at which the circulation of the battery cooling refrigerant is able to be started when the circulation of the battery cooling refrigerant is not started and the liquid surface level is not at the level at which the circulation is able to be started.

The electronic control unit may execute normal cooling control for controlling the temperature control device such that a temperature of the battery cooling refrigerant approaches a first target refrigerant temperature so as to cool the one or more battery cells when the circulation stop condition is not satisfied. The electronic control unit may execute preceding cooling control until the circulation of the battery cooling refrigerant is started when the circulation of the battery cooling refrigerant is not started after the liquid surface level reaches the level at which the circulation is able to be started by execution of the vapor phase temperature rise control. The preceding cooling control is to control the temperature control device such that the temperature of the battery cooling refrigerant approaches a second target refrigerant temperature set higher than the first target refrigerant temperature in the normal cooling control so as to suppress the one or more condensers from being filled with the battery cooling refrigerant in the liquid phase.

The electronic control unit may execute the vapor phase temperature rise control again when the liquid surface level rises above the level at which the circulation is able to be started during execution of the preceding cooling control.

The battery cooling device may further include one or more heaters disposed on the vapor phase side of the battery cooling circuit. Then, the electronic control unit may operate the one or more heaters during the execution of the vapor phase temperature rise control.

The one or more condensers may include a first condenser that exchanges heat between the battery cooling refrigerant, and an air conditioning refrigerant flowing through a vehicle air conditioning device mounted on the vehicle or a fluid that exchanges heat with the air conditioning refrigerant, and an air-cooled second condenser. Then, the second condenser may be disposed below the first condenser in the vertical direction.

The one or more condensers may include a first condenser that exchanges heat between the battery cooling refrigerant, and an air conditioning refrigerant flowing through a vehicle air conditioning device mounted on the vehicle or a fluid that exchanges heat with the air conditioning refrigerant, and an air-cooled second condenser. The battery cooling circuit may further include a flow path switching valve with which a non-bypass flow path state in which the battery cooling refrigerant in the vapor phase discharged from the one or more coolers passes through the first condenser and the second condenser in order, and a bypass flow path state in which the battery cooling refrigerant in the vapor phase discharged from the one or more coolers bypasses the first condenser and passes through the second condenser are able to be selected. Then, the electronic control unit may control the flow path switching valve such that the bypass flow path state is selected during the execution of the vapor phase temperature rise control.

With the battery cooling device according to the present disclosure, the vapor phase temperature rise control is executed, after the circulation stop condition is satisfied, when the circulation of the battery cooling refrigerant is not started and the liquid surface level of the battery cooling refrigerant is not at the level at which the circulation is able to be started. Thereby, it is possible to lower the liquid surface level. As a result, the circulation can be started at an earlier timing than when the process proceeds to the normal cooling control without performing the vapor phase temperature rise control under the circulation stop condition.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In each of the embodiments described below, the elements common to each figure are designated by the same reference signs, and duplicate description will be omitted or simplified. Further, in the following embodiments, when the number, a quantity, an amount, or a range of each element, for example, is mentioned, the technical idea of the present disclosure is not limited to the mentioned number, etc., unless otherwise specified or except for the case where the number is obviously limited to the number mentioned in the embodiments in principle. Further, configurations, steps, etc. that will be described in the following embodiments are not necessarily essential to the technical ideas according to the present disclosure, unless otherwise specified or except for the case where configurations are obviously limited to the configurations mentioned in the embodiments in principle.

1. First Embodiment 1-1. Configuration of Battery Cooling Device

Figure 1:
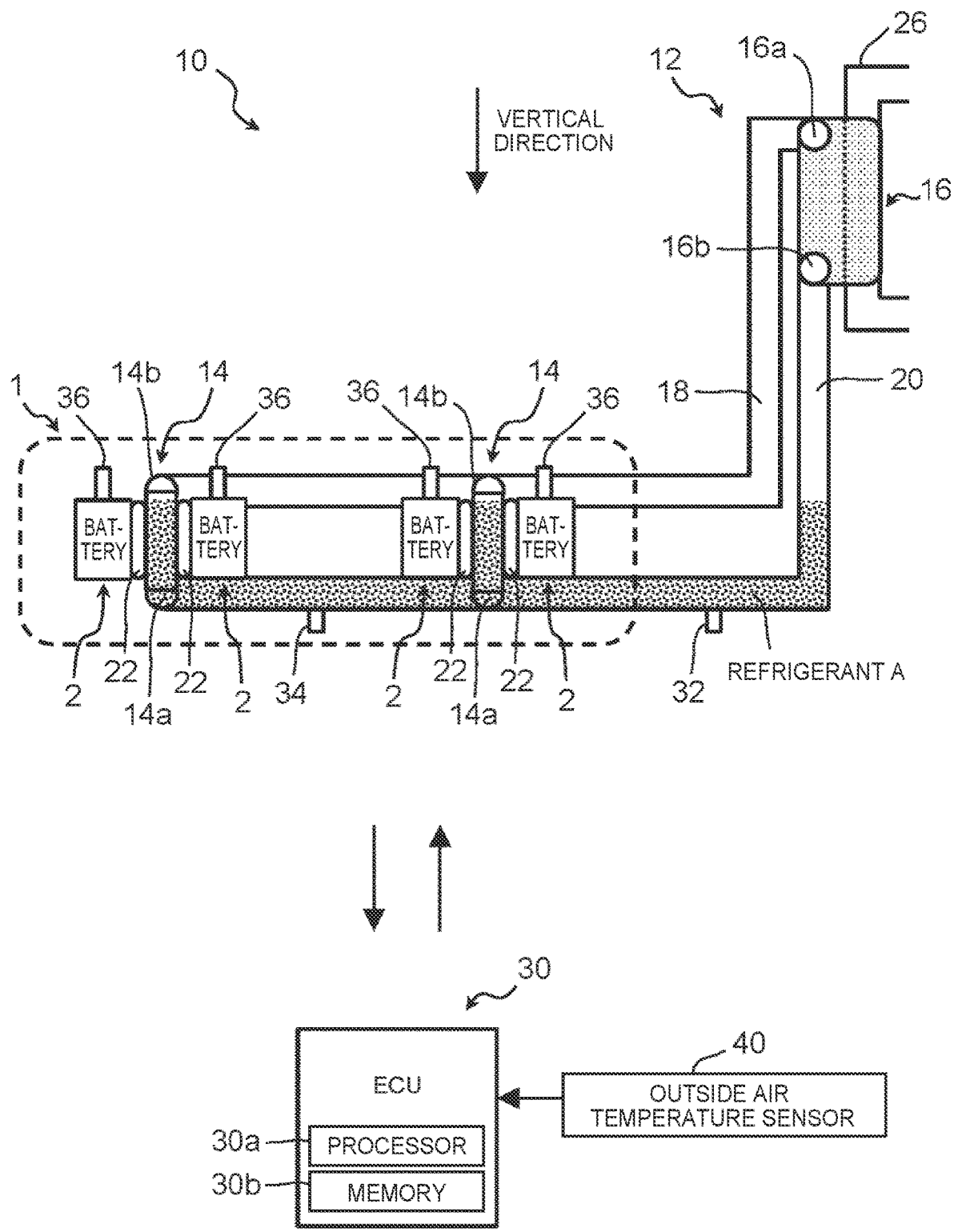
FIG. 1 is a diagram showing a schematic configuration of a battery cooling device according to a first embodiment.

FIG. 1 is a diagram showing a schematic configuration of a battery cooling device 10 according to a first embodiment. The battery cooling device 10 is mounted on a vehicle. More specifically, the vehicle is equipped with a battery pack 1. For example, the battery pack 1 accommodates a plurality of stacked battery cells. However, the number of battery cells accommodated in the battery pack 1 is not particularly limited and may be one. The battery pack 1 stores electric power supplied to a vehicle traveling motor.

When the battery pack 1 is discharged and charged, each battery cell generates heat as it is energized. The battery cooling device 10 is configured to cool each battery cell in the battery pack 1. As an example, FIG. 1 shows four battery stacks 2 that are a stack of a plurality of battery cells stacked on the further side from a viewer of FIG. 1.

The battery cooling device 10 transports heat of the battery cells of each battery stack 2 and dissipates the heat. Specifically, the battery cooling device 10 includes a thermosiphon type battery cooling circuit 12 in which a refrigerant (working fluid) is sealed. The battery cooling circuit 12 includes a cooler 14, a condenser 16, a vapor passage 18, and a liquid passage 20. The refrigerant flowing in the battery cooling circuit 12 corresponds to an example of a "battery cooling refrigerant" according to the present disclosure. In the following description, the battery cooling refrigerant is referred to as "refrigerant A" and an air conditioning refrigerant is referred to as "refrigerant B" in order to distinguish the battery cooling refrigerant from the "air conditioning refrigerant" used in a vehicle air conditioning device 24 described below.

The vapor passage 18 connects each cooler 14 and the condenser 16. The liquid passage 20 connects the condenser 16 and each cooler 14. That is, the vapor passage 18 and the liquid passage 20 are provided in an annular shape as a refrigerant passage. The battery cooling circuit 12 is a heat pipe that transfers heat by evaporating and condensing the refrigerant A, and is configured to form loop thermosiphon in which the vapor passage 18 through which the refrigerant A in the vapor phase state (vapor phase refrigerant) flows and the liquid passage 20 through which the refrigerant A in the liquid phase state (liquid phase refrigerant) are separated.

As the refrigerant A circulating in the battery cooling circuit 12, for example, a fluorocarbon-based refrigerant (for example, R134a or R1234yf) used in a vapor compression refrigeration cycle can be used. Alternatively, as the refrigerant A, for example, another refrigerant such as carbon dioxide or an antifreeze liquid may be used.

As shown in FIG. 1, the cooler 14 is disposed between each of the pair of battery stacks 2 as an example. Since FIG. 1 illustrates two pairs of battery stacks 2, the number of coolers 14 in this example is two. However, the number of coolers may vary depending on the arrangement of the battery cells in the battery pack 1, and may be one or three or more. Each cooler 14 is in contact with each side surface of two adjacent battery stacks 2, for example, via a heat conductive material 22. More specifically, the cooler 14 extends in the stacking direction of the battery cells (further side from a viewer of the figure), and is provided so as to come into contact with each battery cell included in each battery stack 2 via the heat conductive material 22.

Inside the cooler 14, a refrigerant passage that functions as a part of the refrigerant passage of the battery cooling circuit 12 is provided. The liquid phase refrigerant is supplied to the cooler 14 from the liquid passage 20. The cooler 14 cools each battery cell by absorbing the heat generated by the battery stack 2 (a plurality of battery cells) and evaporating the liquid phase refrigerant.

As shown in FIG. 1, an inlet (liquid inlet) 14*a* of the liquid phase refrigerant to the cooler 14 is provided downward in the vertical direction. An outlet (vapor outlet) 14*b* of the vapor phase refrigerant from the cooler 14 is provided upward in the vertical direction. In the direction orthogonal to the vertical direction (further side from a viewer of the figure), the liquid inlet 14*a* and the vapor outlet 14*b* are disposed on opposite sides to each other. As a result, the liquid phase refrigerant supplied to the cooler 14 receives the heat of each battery cell and is vaporized (boils) (boiling cooling). The vapor phase refrigerant (vapor) vaporized inside the cooler 14 moves upward in the vertical direction and flows out from the vapor outlet 14*b* to the vapor passage 18.

The vapor passage 18 is a refrigerant passage that allows the refrigerant A (vapor phase refrigerant) in the vapor phase state vaporized by the cooler 14 to flow to the condenser 16. That is, the heat generated in each battery cell is transported to the condenser 16 by the vapor phase refrigerant. More specifically, the vapor phase refrigerants from the coolers 14 are merged, and the vapor passage 18 extends upward in the vertical direction and is connected to a vapor inlet 16*a* of the condenser 16.

Inside the condenser 16, a refrigerant passage that functions as a part of the refrigerant passage of the battery cooling circuit 12 is provided. The condenser 16 cools and condenses the vapor phase refrigerant vaporized by the cooler 14. That is, the heat transported from the cooler 14 is dissipated in the condenser 16.

The condenser 16 is disposed above the cooler 14 in the vertical direction. The specific configuration of the condenser 16 for condensing the vapor phase refrigerant is not particularly limited. As an example, the condenser 16 is a liquid-cooled condenser that utilizes the vehicle air conditioning device 24 for conditioning air in a vehicle cabin.

Figure 2:
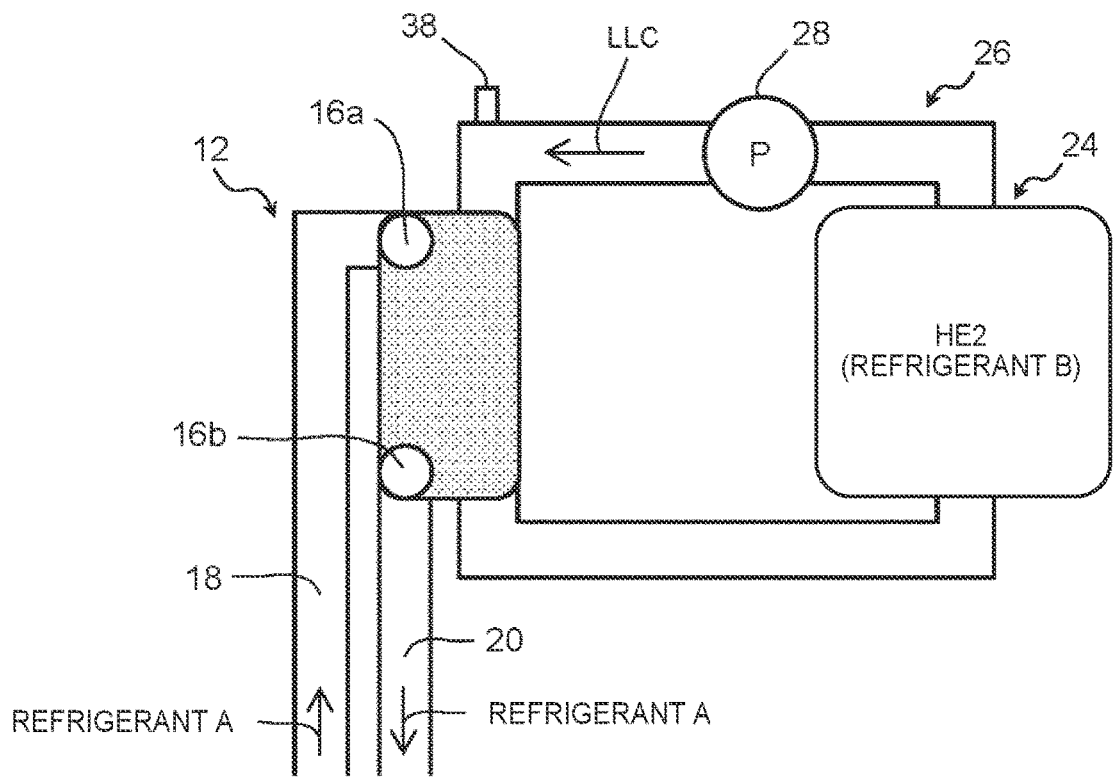
FIG. 2 is a diagram showing a schematic configuration of surrounding parts of a first condenser according to the first embodiment.

FIG. 2 is a diagram showing a schematic configuration of surrounding parts of the condenser 16 according to the first embodiment. In the configuration example shown in FIG. 2, the vehicle air conditioning device 24 and a fluid circulation circuit 26 are used. The vehicle air conditioning device 24 is, for example, a heat pump type air conditioning device. The fluid circulation circuit 26 is a circuit that circulates a fluid (for example, long life coolant (LLC)) that exchanges heat with the refrigerant A flowing through the condenser 16, and includes a pump 28 (for example, an electric type) that circulates the LLC.

More specifically, the vehicle air conditioning device 24 includes a heat exchange unit HE1 that exchanges heat between the air blown into the vehicle cabin and the refrigerant B (air conditioning refrigerant), and a heat exchange unit HE2 that can exchange heat between the refrigerant B and the LLC. In FIG. 2, only the heat exchange unit HE2 is shown as the vehicle air conditioning device 24. The heat exchange unit HE2 is disposed on the fluid circulation circuit 26. According to the configuration shown in FIG. 2, the vehicle air conditioning device 24 is controlled such that the cooling operation is performed while the refrigerant B is flown to the heat exchange unit HE2, and the pump 28 is operated to exchange the heat between the refrigerant B and the LLC, so that the temperature of the LLC can be lowered by utilizing the refrigerant B. Further, the vehicle air conditioning device 24 is controlled such that the heating operation is performed while the refrigerant B is flown to the heat exchange unit HE2, and the pump 28 is operated to exchange the heat between the refrigerant B and the LLC, so that the temperature of the LLC can also be raised by utilizing the refrigerant B.

As described above, according to the configuration shown in FIG. 2, the temperature of the LLC can be raised or lowered by utilizing the vehicle air conditioning device 24. The condenser 16 is configured to exchange heat between the refrigerant A and the LLC. Therefore, by adjusting the temperature of the LLC (temperature control), the refrigerant A flowing in the condenser 16 can be cooled or heated. In other words, the pump 28 is operated to circulate the LLC in the fluid circulation circuit 26 with a desired circulation amount, and each component (for example, an expansion valve, a flow path switching valve, and a compressor) of the vehicle air conditioning device 24 is controlled, so that the heat dissipation capacity of the condenser 16 can be adjusted. In the configuration example shown in FIG. 2, the combination of the vehicle air conditioning device 24 and the fluid circulation circuit 26 corresponds to an example of the "temperature control device that controls the temperature of at least one of one or more condensers" according to the present disclosure.

The configuration of the condenser 16 is not limited to the above example in which the LLC is used. That is, the condenser 16 may be configured to, for example, directly exchange the heat between the refrigerant A and the refrigerant B used in the vehicle air conditioning device 24 without using the LLC. In this example, the vehicle air conditioning device 24 corresponds to another example of the "temperature control device". Further, the condenser 16 may be, for example, an air-cooled type instead of the liquid-cooled type. That is, the condenser 16 may be configured as, for example, an air-cooled radiator configured to exchange heat between an outside air and the refrigerant A. Further, in an example of the air-cooled type, a travel wind of the vehicle may be used to exchange the heat between the outside air and the refrigerant A, or a blower fan (for example, an electric type) for forcibly supplying the outside air to the condenser 16 may be used instead of or together with the travel wind. In the example of the air-cooled type, a radiator with the blower fan corresponds to another example of the "temperature control device".

Returning to FIG. 1, the liquid passage 20 is connected to the liquid outlet 16*b* of the condenser 16. The liquid passage 20 is a refrigerant passage that allows the liquid phase refrigerant liquefied by the condenser 16 to flow to the cooler 14. The liquid passage 20 extends downward along the vertical direction, extends along the horizontal direction, and is connected to the liquid inlet 14*a* of each cooler 14. As a result, the liquid phase refrigerant flowing out of the condenser 16 moves downward in the vertical direction due to the own weight of the liquid phase refrigerant.

According to the battery cooling circuit 12 described above, when the battery cell of each battery stack 2 becomes a high temperature in a state where the vapor phase refrigerant can be cooled by the condenser 16, the battery cell can be continuously cooled due to natural circulation of the refrigerant.

Further, the battery cooling device 10 includes an electronic control unit (ECU) 30. The ECU 30 is a computer that executes various processes related to the battery cooling device 10. Specifically, the process executed by the ECU 30 includes the process related to the control of the vehicle air conditioning device 24 and the fluid circulation circuit 26 for controlling the temperature of the condenser 16. The ECU 30 includes a processor 30a and a storage device 30b. The processor 30a reads and executes a program stored in the storage device 30b. As a result, various processes by the processor 30a are realized.

The ECU 30 receives sensor signals from various sensors used in the above various processes. The various sensors described here include, for example, refrigerant temperature sensors 32 and 34, a battery temperature sensor 36, an LLC temperature sensor 38, and an outside air temperature sensor 40. The refrigerant temperature sensor 32 is attached to the liquid passage 20 in order to detect the temperature of the liquid phase refrigerant outside the battery pack 1 (hereinafter, also simply referred to as "refrigerant temperature $T_{LQ}1$"). The refrigerant temperature sensor 34 is attached to the liquid passage 20 in order to detect the temperature of the liquid phase refrigerant inside the battery pack 1 (hereinafter, also simply referred to as "refrigerant temperature $T_{LQ}2$"). The battery temperature sensor 36 detects the temperature of the battery cell (hereinafter, also simply referred to as "battery temperature $T_B$"). As an example, the battery temperature sensor 36 is provided in a predetermined number of battery cells among the battery cells included in each of the battery stacks 2. The LLC temperature sensor 38 is attached to the fluid circulation circuit 26 in order to detect the temperature $T_{LLC}$ of the LLC flowing into the condenser 16. The outside air temperature sensor 40 is attached to the vehicle and detects the outside air temperature $T_A$.

1-2. Control of Battery Cooling Device

Next, the control of the battery cooling device 10 for controlling the temperature of the condenser 16, more specifically, the control of the "temperature control device (vehicle air conditioning device 24 and fluid circulation circuit 26)" will be described.

1-2-1. Normal Cooling Control

The "normal cooling control" corresponds to the basic control of the battery cooling device 10 executed for cooling the battery (each battery cell of the battery stack 2).

Figure 3:
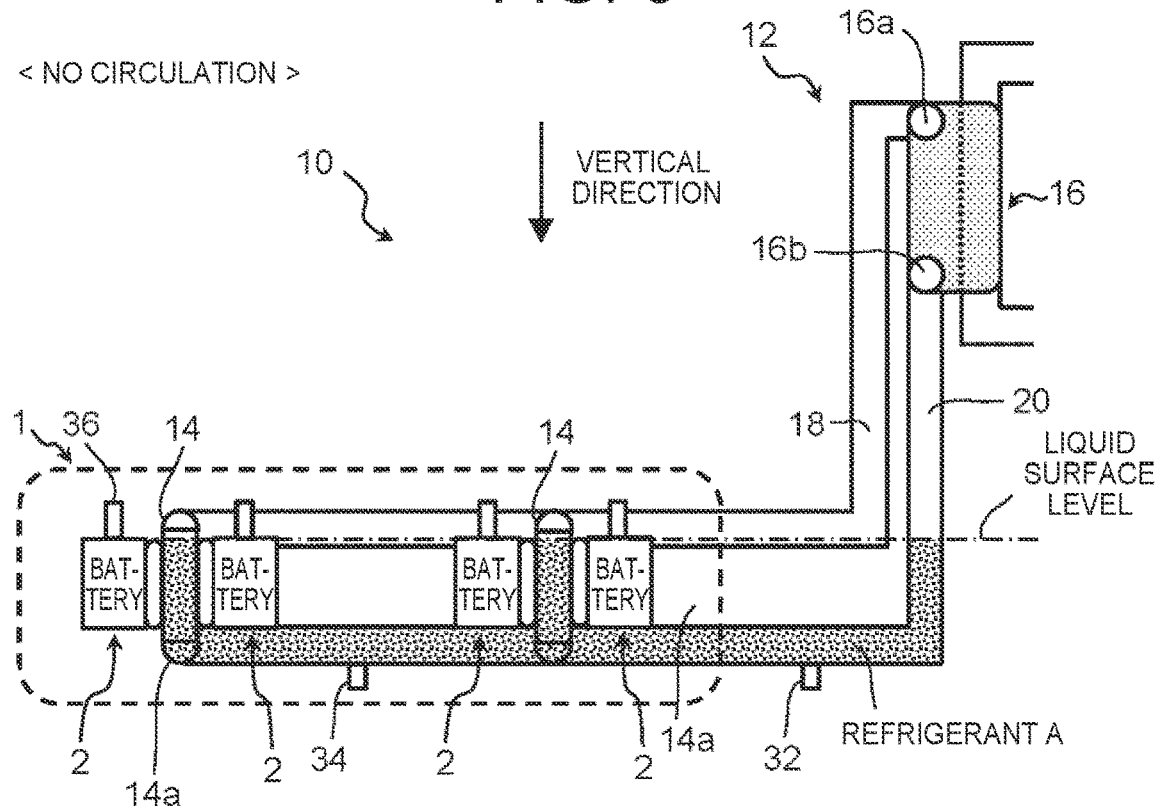
FIG. 3 is a diagram showing a state in which a battery cooling refrigerant (refrigerant A) is not circulated.

FIG. 3 is a diagram showing a state in which the refrigerant A is not circulated. An appropriate amount of the refrigerant A is sealed in the battery cooling circuit 12. The appropriate amount is set such that a liquid surface level at which dryout does not occur can be obtained when the vehicle is tilted and when acceleration is applied to the vehicle due to acceleration/deceleration or turning of the vehicle, for example. In the battery cooling circuit 12 in which the refrigerant A is sealed, the refrigerant A is in a saturated state.

Figure 4:
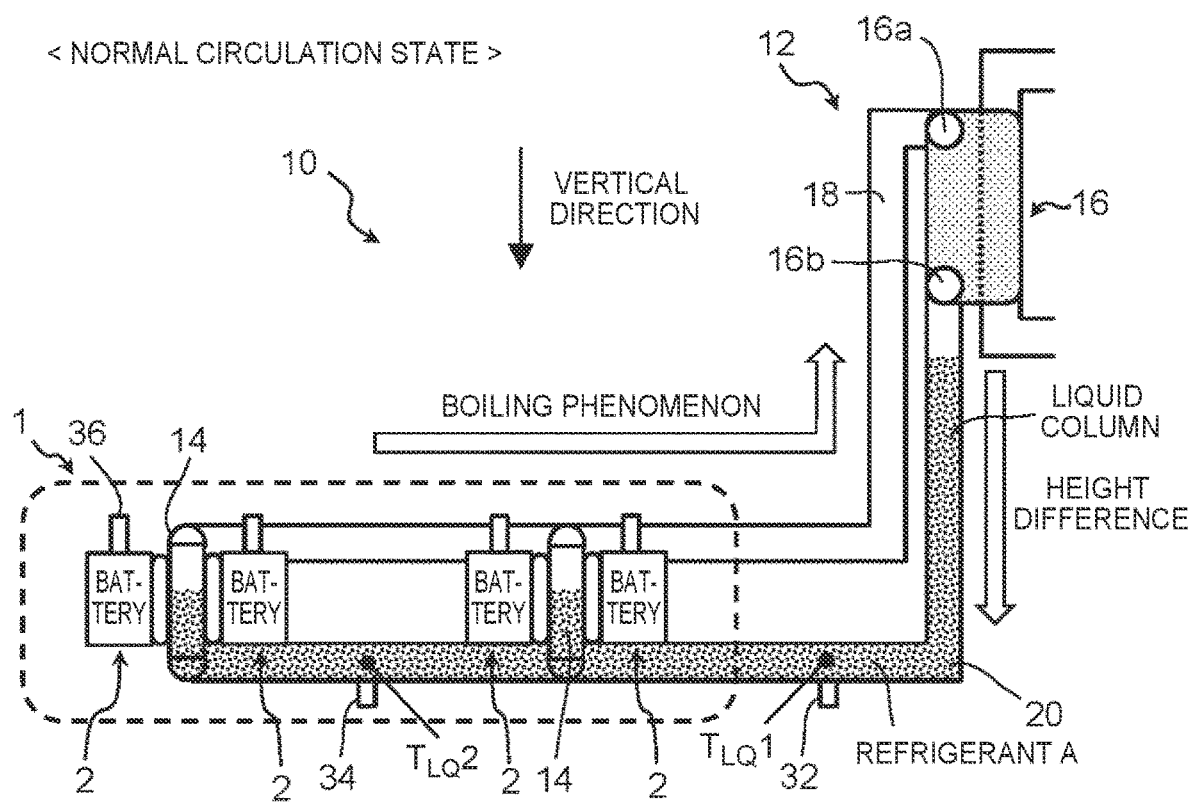
FIG. 4 is a diagram showing a normal circulation state during execution of normal cooling control.

FIG. 4 is a diagram showing a normal circulation state during execution of the normal cooling control. The circulation of the refrigerant A in the battery cooling circuit 12 is performed by the vaporization (boiling) of the refrigerant A in the cooler 14 and the condensation of the refrigerant A in the condenser 16.

More specifically, when the cooling of the condenser 16 is started by the temperature control of the LLC, the vapor phase refrigerant is condensed in the condenser 16. As a result, as shown in FIG. 4, a liquid column is formed at a portion extending along the vertical direction in the liquid passage 20. The own weight of the refrigerant A in the liquid column portion serves as a driving force for the refrigerant A to flow the liquid phase refrigerant from the condenser 16 side to the cooler 14 side. On the other hand, on the cooler 14 side, when each battery cell generates heat and a temperature difference between each battery cell and the liquid phase refrigerant occurs, the liquid phase refrigerant boils in the cooler 14. The resulting vapor phase refrigerant flows through the vapor passage 18 toward the condenser 16. In addition, as the refrigerant A is liquefied in the condenser 16 and flows out of the condenser 16, the pressure of the vapor phase refrigerant in the vapor passage 18 decreases. This promotes the boiling of the refrigerant A in the cooler 14.

In order to cool the battery while maintaining the normal circulation state shown in FIG. 4, the ECU 30 executes the normal cooling control. In this normal cooling control, the ECU 30 controls the vehicle air conditioning device 24 and the fluid circulation circuit 26 such that the temperature of the refrigerant A (for example, the temperature $T_{LQ}1$ of the refrigerant A outside the battery pack 1 detected by the refrigerant temperature sensor 32) approaches a target refrigerant temperature T0. More specifically, for example, while the ECU 30 operates the pump 28 to circulate the LLC, the ECU 30 controls the throttle opening of the expansion valve (not shown) of the vehicle air conditioning device 24 such that the refrigerant temperature $T_{LQ}1$ approaches the target refrigerant temperature T0.

The target refrigerant temperature T0 is calculated, for example, as a value that is based on a battery heat generation amount Q. The battery heat generation amount Q is the total heat generation amount of the battery cells accommodated in the battery pack 1. The battery heat generation amount Q can be calculated based on, for example, the output current value of the battery pack 1 acquired using a current sensor (not shown) and the electric resistance values of the battery cells accommodated in the battery pack 1. The target refrigerant temperature T0 corresponds to an example of a "first target refrigerant temperature" according to the present disclosure.

1-2-2. Issues Related to Refrigerant Circulation

Figure 5A:
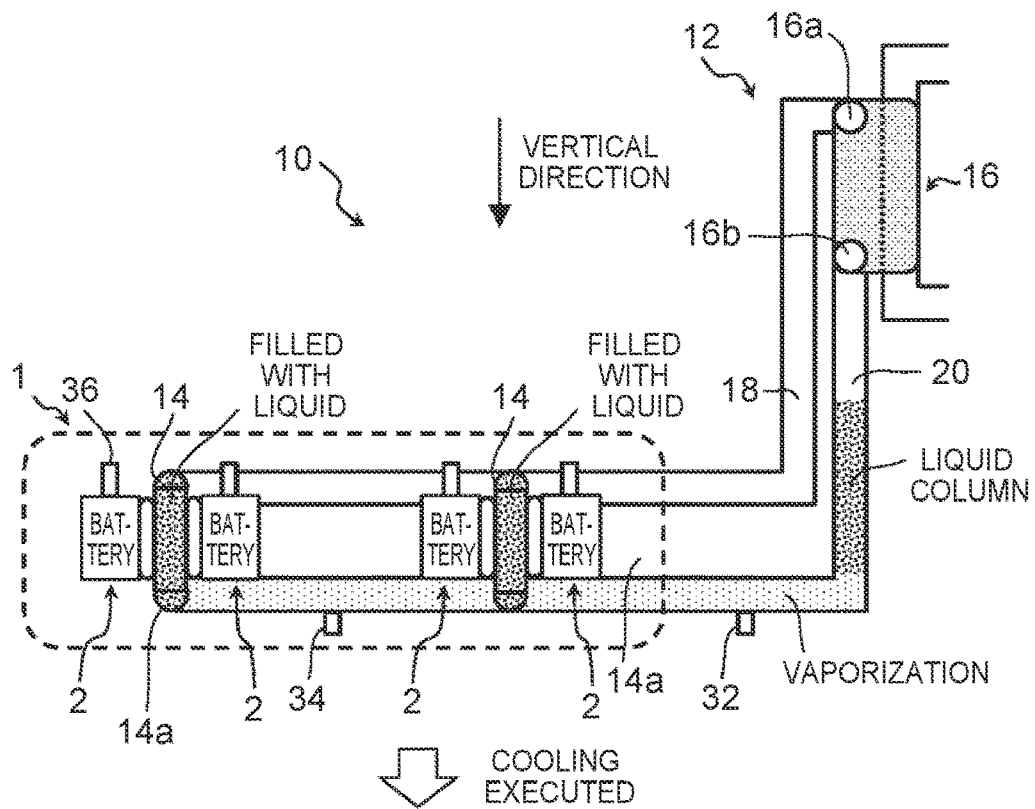
FIG. 5A is a diagram for describing an issue related to refrigerant circulation in a battery cooling circuit.
Figure 5B:
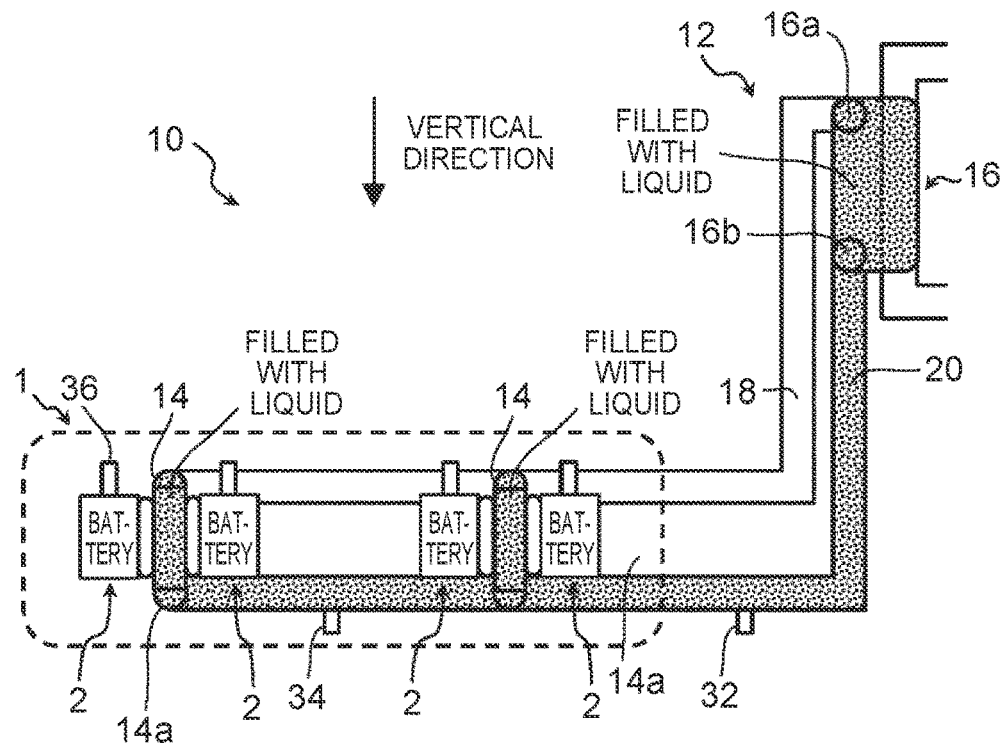
FIG. 5B is a diagram for describing an issue related to the refrigerant circulation in the battery cooling circuit.

FIGS. 5A and 5B are diagrams for describing an issue related to refrigerant circulation in the battery cooling circuit 12. More specifically, FIG. 5A shows a state of the battery cooling circuit 12 when a "circulation stop condition" in which the circulation of the refrigerant A may be stopped is satisfied. FIG. 5B shows a state of the battery cooling circuit 12 when the refrigerant A in the condenser 16 is cooled from the state shown in FIG. 5A.

First, the "circulation stop condition" described here can be satisfied when the vehicle moves from a low outside air temperature environment to a high outside air temperature environment in a state where the battery temperature $T_B$ is low because the battery stack 2 does not generate heat. Such a circulation stop condition can be satisfied, for example, when the vehicle moves from the garage where the room temperature is controlled in a high outside temperature area.

When the circulation stop condition is satisfied, the refrigerant A is vaporized at the portion of the liquid passage 20 close to the battery stack 2, as shown in FIG. 5A. The battery cooling circuit 12 is in a saturated state. Therefore, with the vaporization of the refrigerant A at the above portion, the liquid phase refrigerant accumulates in the cooler 14 or accumulates at the portion along the vertical direction in the liquid passage 20. In addition, a state shown in FIG. 5A can be obtained in a state where the cooling of the refrigerant A in the condenser 16 and the heat generation of the battery stack 2 are not started.

When the cooling of the refrigerant A by the normal cooling control is started for battery cooling while the battery cooling circuit 12 is in the state shown in FIG. 5A, the inside of the battery cooling circuit 12 is in a state shown in FIG. 5B. That is, since the cooler 14 is filled with liquid and the battery temperature $T_B$ is low, the boiling of the refrigerant A in the cooler 14 is not started. Then, since the cooling of the refrigerant A in the condenser 16 proceeds in a state where the vapor phase refrigerant is not supplied from the cooler 14 to the condenser 16, the liquid column in the liquid passage 20 becomes high, and the condenser 16 is filled with liquid. Further, when the condenser 16 is filled with liquid, a decrease in the pressure of the vapor phase refrigerant in the vapor passage 18 due to the condensed refrigerant A flowing out from the condenser 16 does not occur or is less likely to occur. As a result, even when the battery stack 2 starts to generate the heat, the boiling of the refrigerant A is less likely to be started in the cooler 14, so that a state in which the cooler 14 is filled with liquid is not eliminated or is less likely to be eliminated. Therefore, the circulation of the refrigerant A is not performed.

In the state shown in FIG. 5B as described above, the circulation of the refrigerant A is less likely to be started even though the temperature control of the condenser 16 is started. Alternatively, the start of the circulation is delayed (in other words, the circulation is not started until the battery temperature $T_B$ reaches a high temperature equivalent to the outside air temperature). The start of cooling the battery stack 2 is delayed. In addition, when the condenser 16 is filled with the refrigerant A, a heat transfer area between the vapor phase refrigerant and the LLC in the condenser 16 becomes small. This leads to a decrease in the amount of condensation of the refrigerant A, which makes it more difficult for the refrigerant A to circulate.

When the "circulation stop condition" described above is satisfied and the circulation is stopped as a result, the battery stack 2 cannot be cooled, or the start of cooling the battery stack 2 is delayed.

1-2-3. Control of Battery Cooing Device Under Circulation Stop Condition

In view of the above issues, in the present embodiment, the ECU 30 executes, after the circulation stop condition is satisfied, "vapor phase temperature rise control" such that a liquid surface level of the refrigerant A reaches a level at which the circulation of the refrigerant A can be started when the circulation of the refrigerant A is not started and the liquid surface level is not at the level at which the circulation can be started. The vapor phase temperature rise control is to raise the temperature of the vapor phase side in the battery cooling circuit 12 by controlling the vehicle air conditioning device 24 and the fluid circulation circuit 26.

Further, when the circulation of the refrigerant A is not started after the liquid surface level reaches the level at which the circulation can be started by the execution of the vapor phase temperature rise control, the ECU 30 executes "preceding cooling control" until the circulation of the refrigerant A is started. The preceding cooling control is to control the refrigerant temperature $T_{LQ}1$ such that the refrigerant temperature $T_{LQ}1$ approaches the target refrigerant temperature T0'. The target refrigerant temperature T0' is set higher than the target refrigerant temperature T0 in the normal cooling control such that the condenser 16 is not filled with the liquid phase refrigerant. The target refrigerant temperature T0' corresponds to an example of a "second target refrigerant temperature" according to the present disclosure.

Further, when the liquid surface level rises above the level at which the circulation can be started during the execution of the preceding cooling control, the ECU 30 executes the vapor phase temperature rise control again.

Figure 6:
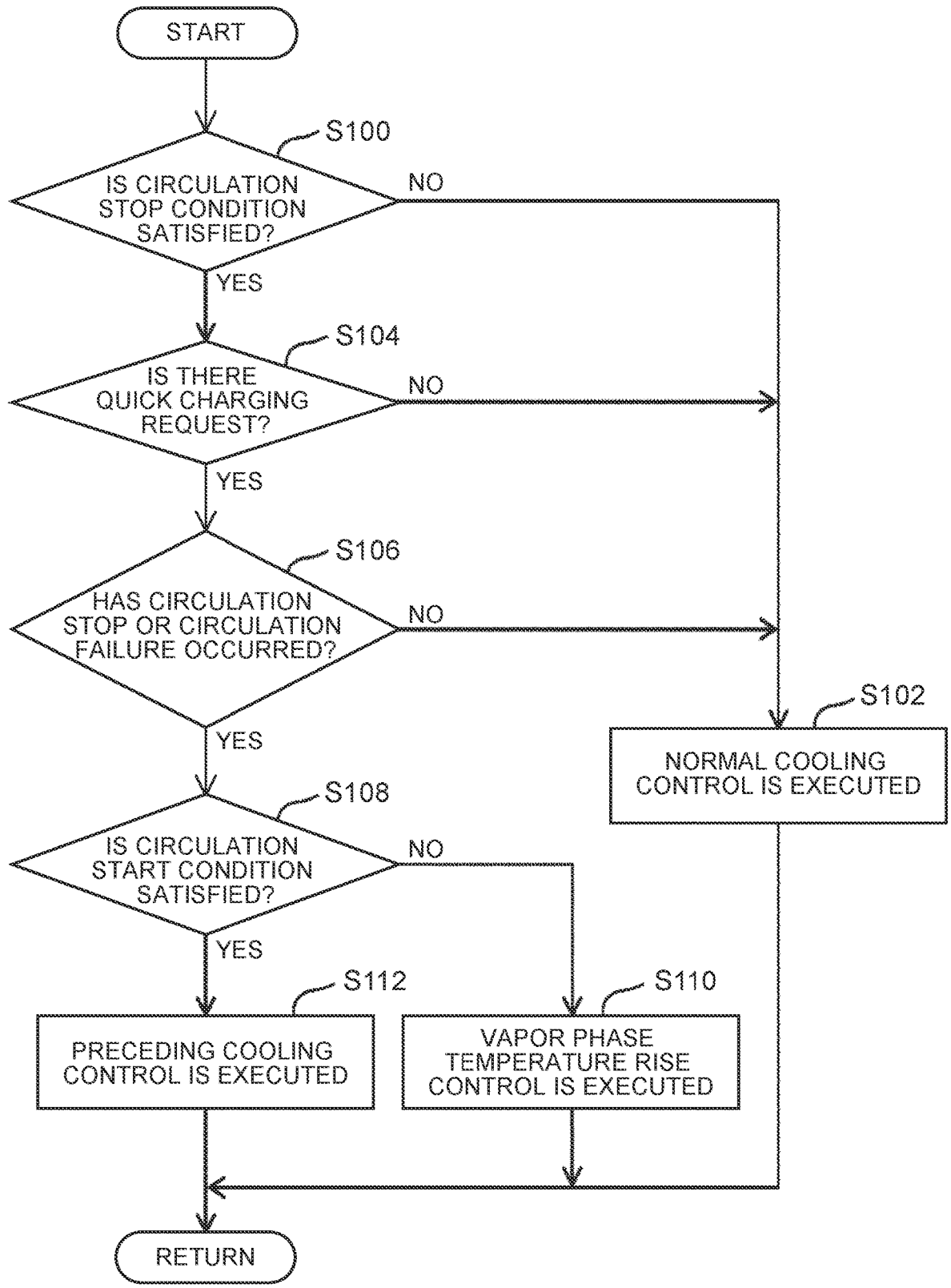
FIG. 6 is a flowchart showing a flow of a process related to control of the battery cooling device according to the first embodiment.

FIG. 6 is a flowchart showing a flow of a process related to control of the battery cooling device 10 according to the first embodiment. The process of this flowchart is repeatedly executed when there is a battery cooling request during the starting of the vehicle system.

In FIG. 6, the ECU 30 first determines in step S100 whether the circulation stop condition is satisfied based on the battery temperature $T_B$ and the outside air temperature $T_A$. Specifically, whether the circulation stop condition is satisfied is determined by, for example, the following method. That is, a map (not shown) that defines the relationship between the battery temperature $T_B$ and a threshold value $TH_{TA}$ of the outside air temperature $T_A$ is stored in the storage device 30b of the ECU 30 in advance. According to this map, the threshold value $TH_{TA}$ is set to be, for example, small as the battery temperature $T_B$ is low.

Then, in this step S100, the ECU 30 acquires the threshold value $TH_{TA}$ corresponding to the current battery temperature $T_B$ detected by the battery temperature sensor 36. Then, the ECU 30 determines that the circulation stop condition is satisfied when the current outside air temperature $T_A$ detected by the outside air temperature sensor 40 is equal to or higher than the acquired threshold value $TH_{TA}$.

Whether the circulation stop condition is satisfied may be determined by using the threshold value $TH_{TA}$ of the outside air temperature $T_A$ and a threshold value $TH_{TLQ}$ of the refrigerant temperature $T_{LQ}1$ that is also set to be a value corresponding to the battery temperature $T_B$. Specifically, the ECU 30, for example, may determine that the circulation stop condition is satisfied when the current outside air temperature $T_A$ is equal to or higher than the threshold value $TH_{TA}$ and the current refrigerant temperature $T_{LQ}1$ detected by the refrigerant temperature sensor 32 is equal to or higher than the threshold value $TH_{TLQ}$. In addition, in the map that defines the threshold value $TH_{TLQ}$ corresponding to the battery temperature $T_B$, the threshold value $TH_{TLQ}$ may be set to be small, for example, as the battery temperature $T_B$ is low, as in the threshold value $TH_{TA}$. The threshold value $TH_{TLQ}$ may be the same as or different from the threshold value $TH_{TA}$.

When the circulation stop condition is not satisfied in step S100, the process proceeds to step S102. In step S102, the ECU 30 executes the above normal cooling control. On the other hand, when the circulation stop condition is satisfied, the process proceeds to step S104.

In step S104, the ECU 30 determines whether there is a quick charging request. For example, when the ECU 30 detects that a power supply plug is connected to a charging inlet for quick charging installed in the vehicle, the ECU 30 determines that the quick charging request is issued. When the quick charging is performed, the amount of heat generated by the battery stack 2 is larger than when the normal charging is performed. Therefore, it is required to start cooling at an earlier timing after the start of charging. As described above, in step S104, the ECU 30 determines whether a condition that there is a request for starting to cool the battery earlier is satisfied. Therefore, in step S104, the ECU 30 may determine whether there is a high load traveling request of the vehicle based on the accelerator operation amount instead of or in addition to the quick charging request, for example.

When there is no quick charging request in step S104, the process proceeds to step S102 and the normal cooling control is executed. On the other hand, when there is a quick charging request, the process proceeds to step S106.

In step S106, the ECU 30 determines whether the circulation of the refrigerant A is stopped in the battery cooling circuit 12 (in other words, whether the circulation is not started). This determination can be made based on, for example, the LLC temperature $T_{LLC}$ detected by the LLC temperature sensor 38 and the refrigerant temperature $T_{LQ}1$. Specifically, when the refrigerant A is properly circulated, the refrigerant temperature $T_{LQ}1$ (that is, the refrigerant temperature at the lower portion of the liquid passage 20 in the vertical direction) is higher by the amount of increase in the refrigerant A corresponding to the battery heat generation amount Q than the LLC temperature $T_{LLC}$ of the LLC flowing into the condenser 16. On the other hand, when the circulation of the refrigerant A is actually stopped, the refrigerant temperature $T_{LQ}1$ becomes a value corresponding to the outside air temperature $T_A$. In other words, the difference between the LLC temperature $T_{LLC}$ and the refrigerant temperature $T_{LQ}1$ increases.

Therefore, in step S106, the ECU 30 determines whether the difference between the LLC temperature $T_{LLC}$ and the refrigerant temperature $T_{LQ}1$ is equal to or greater than a predetermined threshold value. Then, when the difference is equal to or greater than the threshold value, the ECU 30 determines that the circulation of the refrigerant A is stopped (circulation is not started) (step S106; Yes). On the other hand, when the difference is less than the threshold value, the ECU 30 determines that the circulation of the refrigerant A is not stopped (circulation is started) (step S106; No).

In step S106, the following determination may be additionally performed. That is, when the process proceeds to step S106 because the determination results in steps S100 and S104 are Yes during the execution of the normal cooling control in the process of step S102, the ECU 30 may determine, by the following process, presence or absence of circulation failure in which the circulation is not properly performed. That is, the ECU 30 may determine whether the difference between the LLC temperature $T_{LLC}$ and the refrigerant temperature $T_{LQ}1$ is equal to or greater than the above threshold value when a predetermined time has elapsed from the start of the circulation of the refrigerant A. Then, the ECU 30 may determine that the circulation failure has occurred in a case where the above difference when the predetermined time has elapsed is equal to or greater than the threshold value.

When the ECU 30 determines in step S106 that the circulation stop or circulation failure has not occurred, the process proceeds to step S102, and the normal cooling control is executed. On the other hand, when the ECU 30 determines that the circulation stop or circulation failure has occurred, the process proceeds to step S108.

In step S108, the ECU 30 determines whether a condition that the circulation can be started is satisfied (in other words, whether the liquid surface level of the refrigerant A is at a level at which the circulation of the refrigerant A can be started). Specifically, for this determination, the ECU 30 calculates an estimated liquid surface level L1 in the cooler 14 and an estimated liquid surface level L2 of the liquid column in the liquid passage 20. Then, when both the cooler 14 and the condenser 16 are not filled with liquid based on the estimated liquid surface levels L1 and L2 that have been calculated, the ECU 30 determines that the condition that the circulation can be started is satisfied. On the other hand, when either one of or both of the cooler 14 and the condenser 16 are filled with liquid based on the estimated liquid surface levels L1 and L2 that have been calculated, the ECU 30 determines that the condition that the circulation can be started is not satisfied. As described above, in step S108, the ECU 30 determines whether the condition that the circulation of the refrigerant A can be started is satisfied based on the estimated liquid surface levels L1 and L2 of the refrigerant A.

The estimated liquid surface level L1 in the cooler 14 can be calculated, for example, based on the relationship between the refrigerant temperature $T_{LQ}2$ in the battery pack 1 and the battery temperature $T_B$. Specifically, when the refrigerant A is properly circulated, the refrigerant A having a low refrigerant temperature $T_{LQ}2$ cooled by the condenser 16 flows, so that the difference between the battery temperature $T_B$ and the refrigerant temperature $T_{LQ}2$ becomes small. On the other hand, when the circulation is not properly performed, the refrigerant temperature $T_{LQ}2$ is higher than the battery temperature $T_B$, so that it can be determined that the cooler 14 is filled with liquid (that is, the estimated liquid surface level L1 is high). Therefore, the storage device 30b of the ECU 30 stores a map (not shown) that defines the relationship between the estimated liquid surface level L1, and the refrigerant temperature $T_{LQ}2$ and the battery temperature $T_B$. The estimated liquid surface level L1 can be calculated from such a map, for example.

Further, the estimated liquid surface level L2 of the liquid column can be calculated based on the same concept as the estimated liquid surface level L1, for example, based on the relationship between the refrigerant temperature $T_{LQ}1$ outside the battery pack 1 and the LLC temperature $T_{LLC}$. That is, the storage device 30b of the ECU 30 stores a map (not shown) that defines the relationship between the estimated liquid surface level L2, and the refrigerant temperature $T_{LQ}1$ and the LLC temperature $T_{LLC}$. The estimated liquid surface level L2 can be calculated from such a map, for example. Instead of an example in which the estimated liquid surface levels L1 and L2 are used as described above, the liquid surface level in the cooler 14 and the liquid surface level on the liquid column side used for the determination in step S108 may be acquired using, for example, a liquid surface level sensor.

Figure 7:
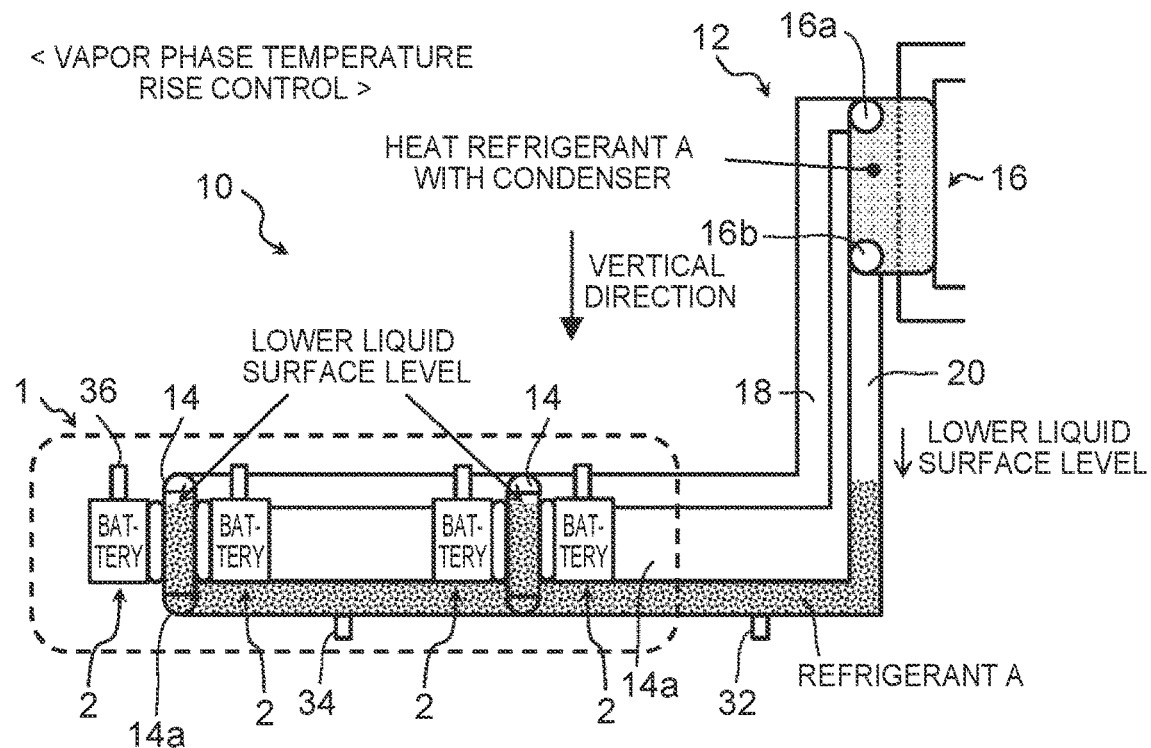
FIG. 7 is a diagram for describing an outline of vapor phase temperature rise control.

When the condition that the circulation can be started is not satisfied in step S108, the process proceeds to step S110. In step S110, the ECU 30 executes the above vapor phase temperature rise control. FIG. 7 is a diagram for describing an outline of the vapor phase temperature rise control. The vapor phase temperature rise control is executed to lower the overall liquid surface level of the battery cooling circuit 12 (that is, the liquid surface level in the cooler 14 and the liquid surface level on the liquid column side) by heating the vapor phase side of the battery cooling circuit 12.

In order to heat the vapor phase side for the above purpose, in an example shown in FIG. 7, the condenser 16 is heated by using the temperature control of the condenser 16. More specifically, the ECU 30 controls the vehicle air conditioning device 24 while operating the pump 28 to raise the temperature $T_{LLC}$ of the LLC flowing through the condenser 16. This heats the condenser 16. Then, the heat transferred from the LLC to the condenser 16 is further transferred to the vapor passage 18. As a result, the vapor phase refrigerant in the vapor passage 18 is heated. Further, the heat transferred to the condenser 16 is also transferred to a portion of the liquid passage 20 close to the condenser 16

(that is, a portion extending along the vertical direction), and the liquid phase refrigerant located at the portion is heated. As a result, according to the vapor phase temperature rise control, the liquid surface level in the cooler 14 and the liquid surface level on the liquid column side are lowered.

When the liquid surface level in the cooler 14 and the liquid surface level on the liquid column side are lowered by the execution of the vapor phase temperature rise control described above, the determination result in step S108 thereafter is Yes. That is, the condition that the circulation can be started is satisfied. As a result, the process proceeds to step S112.

In step S112, the ECU 30 executes the above preceding cooling control. When the circulation of the refrigerant A is started after the condition that the circulation can be started is satisfied in step S108, the determination result in step S106 thereafter is No and the process proceeds to the normal cooling control. That is, the preceding cooling control is executed during a period from when the liquid surface level reaches the level at which the circulation can be started by the execution of the vapor phase temperature rise control to when the circulation of the refrigerant A is started.

Figure 8:
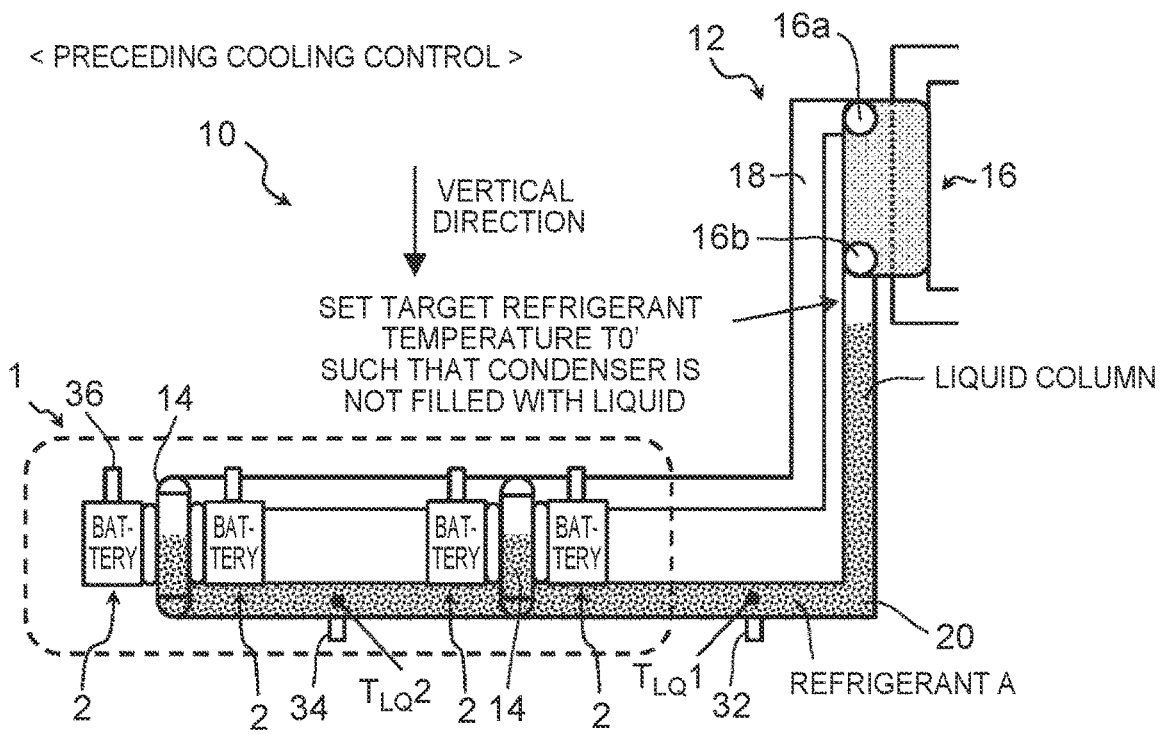
FIG. 8 is a diagram for describing an outline of preceding cooling control.

FIG. 8 is a diagram for describing an outline of the preceding cooling control. When the cooling of the refrigerant A by the normal cooling control is started immediately after the condition that the circulation can be started is satisfied, there is a concern that the condenser 16 will be filled with liquid. Therefore, the target refrigerant temperature T0' used in the preceding cooling control is set higher than the target refrigerant temperature T0 in the normal cooling control such that the condenser 16 is not filled with the liquid phase refrigerant. More specifically, the target refrigerant temperature T0' is determined in advance by experiments or the like such that the liquid surface level of the liquid column does not exceed the lower surface of the condenser 16 in the vertical direction and is as close as possible to the lower surface thereof. Then, the refrigerant temperature $T_{LQ}1$ is controlled so as to approach such a target refrigerant temperature T0'.

In addition, according to the process of the flowchart shown in FIG. 6, if the cooling of the refrigerant A by the condenser 16 progresses more than expected during the execution of the preceding cooling control, and the resulting liquid surface level becomes higher than the level at which the circulation can be started, the determination result in step S108 is No. In this case, the vapor phase temperature rise control is executed again in step S110. Then, when the liquid surface level is lowered again by the execution of the vapor phase temperature rise control and the condition that the circulation can be started is satisfied again, the preceding cooling control is executed again. As described above, according to the process of this flowchart, during the period until the circulation of the refrigerant A is started (that is, during the period until the determination result in step S106 is No after the process proceeds to step S108), the liquid surface level can be controlled such that the liquid surface level of the liquid column is maintained as high as possible while the condenser 16 is suppressed from being filled with liquid.

1-3. Effect

As described above, with the battery cooling device 10 according to the first embodiment, the vapor phase temperature rise control is executed, after the circulation stop condition is satisfied, when the circulation of the refrigerant A is not started and the liquid surface level of the refrigerant A is not at the level at which the circulation of the refrigerant A can be started. As a result, the liquid surface level can be lowered such that the condenser 16 and the cooler 14 are not filled with liquid. As a result, the circulation can be started at an earlier timing than when the process proceeds to the normal cooling control without performing the vapor phase temperature rise control under the circulation stop condition.

Further, according to the battery cooling device 10, when the circulation of the refrigerant A is not started after the liquid surface level has reached the level at which the circulation can be started by the execution of the vapor phase temperature rise control, the preceding cooling control using the target refrigerant temperature T0' that is higher than the target refrigerant temperature T0 in the normal cooling control is executed until the circulation of the refrigerant A is started. As a result, the liquid surface level of the liquid column in the liquid passage 20 can be maintained as high as possible while the condenser 16 is suppressed from being filled with liquid as compared with a case where the process proceeds to the normal cooling control immediately after the vapor phase temperature rise control is executed. As a result, the own weight of the liquid phase refrigerant at the liquid column portion can be increased to promote the prompt start of the circulation of the refrigerant A.

Further, according to the battery cooling device 10, even when the liquid surface level rises again after the start of the preceding cooling control, the liquid surface level can be lowered by executing the vapor phase temperature rise control again. Then, when the liquid surface level is lowered again and the circulation is not started, the preceding cooling control is executed again. As described above, by repeatedly executing the vapor phase temperature rise control and the preceding cooling control as necessary, the circulation can be started soon. Then, instead of the combination of the vapor phase temperature rise control and the normal cooling control, the preceding cooling control using the target refrigerant temperature T0' that is higher than the target refrigerant temperature T0 in the normal cooling control is combined with the vapor phase temperature rise control. As a result, it is possible to attempt to promptly start the circulation of the refrigerant A while the condenser 16 is suppressed from being filled with liquid and the liquid surface level is maintained as high as possible.

1-4. Modification

In order to enhance the effect of the vapor phase temperature rise control described above, a heater may be provided on the vapor phase side of the battery cooling circuit 12. Then, the ECU 30 may operate the heater during the execution of the vapor phase temperature rise control.

Figure 9:
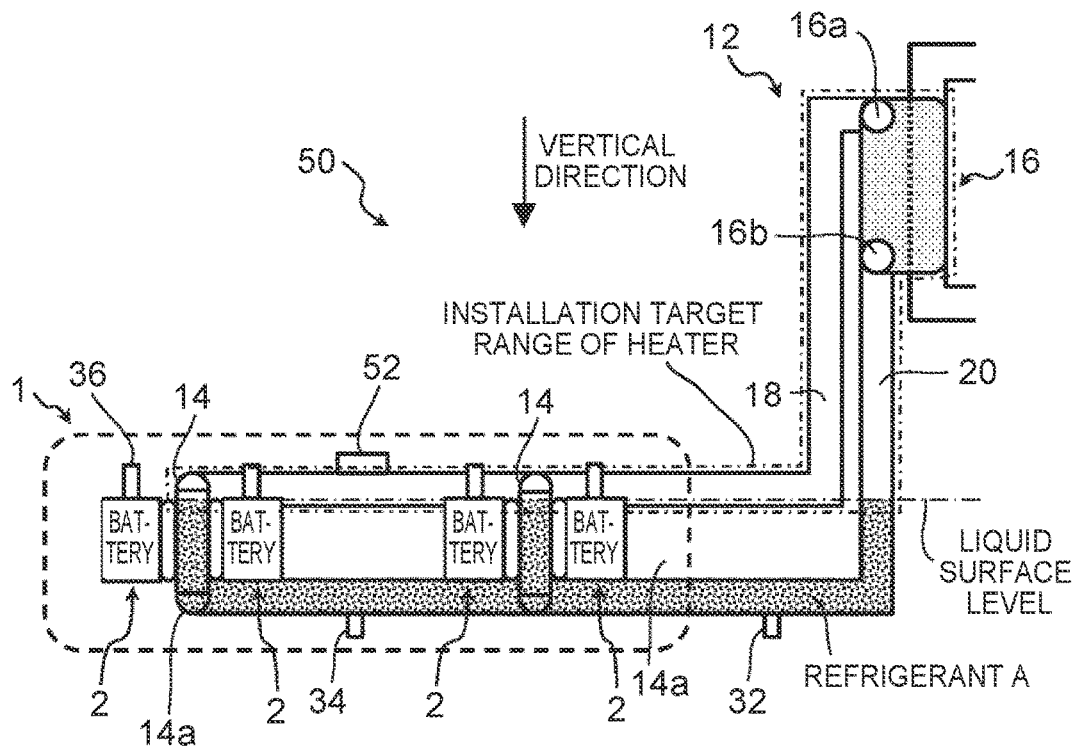
FIG. 9 is a diagram showing an example in which a heater is installed in the battery cooling circuit shown in FIG. 1.

FIG. 9 is a diagram showing an example in which the heater is installed in the battery cooling circuit 12 shown in FIG. 1. A battery cooling device 50 shown in FIG. 9 is different from the battery cooling device 10 according to the first embodiment in that a heater 52 is additionally provided.

Specifically, the heater 52 is disposed at a portion of the vapor passage 18 close to the cooler 14. The heater 52 is disposed at such a portion, so that the liquid surface level in the cooler 14 can be effectively lowered during the execution of the vapor phase temperature rise control. As described above, the heater 52 for heating the vapor phase side is supplementarily provided, so that the effect of the vapor phase temperature rise control can be enhanced. This leads to an early start of the circulation of the refrigerant A.

Here, an installation target range of the heater (range surrounded by an alternate long and short dash line in FIG.

9) is not limited to an example of the heater 52, and may be on the vapor phase side of the battery cooling circuit 12. Specifically, the heater may be disposed in the vapor passage 18, the condenser 16, at an upper portion of the cooler 14 in the vertical direction, and at a portion (portion extending along the vertical direction) of the liquid passage 20 close to the condenser 16. More specifically, it can be said that the installation target range of such a heater (that is, the target to be heated by the vapor phase temperature rise control) corresponds to a portion located on the vapor phase side in a state in which the refrigerant is not circulated (see FIG. 3). Further, a plurality of the heaters may be installed. In addition, a portion where the liquid phase refrigerant is located in a state where the refrigerant is not circulated (see FIG. 3) (that is, the portion of the liquid passage 20 extending along the horizontal direction (right-left direction of the figure) on the lower side in the vertical direction), and a middle portion and a lower portion of the cooler 14 in the vertical direction are excluded from the target to be heated by the heater. This is because when the liquid phase refrigerant is vaporized by heating such a portion on the liquid phase side, the overall liquid surface level of the battery cooling circuit 12 rises, and the circulation stop is promoted.

Further, the above circulation stop condition is satisfied when the battery temperature $T_B$ is low. Therefore, in an example in which the heater is installed in the vapor passage 18 or at the upper portion of the cooler 14, the heater can have a battery warming function as well as a function of supplementarily raising the temperature on the vapor phase side.

Further, the battery cooling circuit 12 according to the first embodiment may be provided with the following heat insulating structure in order to suppress the above circulation start condition from being satisfied. Specifically, in order to suppress the liquid phase refrigerant from being heated by the influence of the high outside temperature, the outer wall surface of the portion of the liquid passage 20 excluded from the above installation target range of the heater (that is, the portion of the liquid passage 20 extending along the horizontal direction (right-left direction of the figure)) may have the heat insulating structure. For example, the outer wall surface may be covered with a heat insulating material. In addition, such a heat insulating structure is not necessary for the installation target range of the heater. This is because it is easier to circulate the refrigerant A when the refrigerant A is heated by the high temperature outside air.

In addition, in the process of the flowchart shown in FIG. 6, the presence or absence of the quick charging request is determined in step S102. Since the process of step S102 described above is performed, it is possible to specify (select) a condition required to start to cool the battery earlier and take measures using the vapor phase temperature rise control and the preceding cooling control.

2. Second Embodiment

Figure 10:
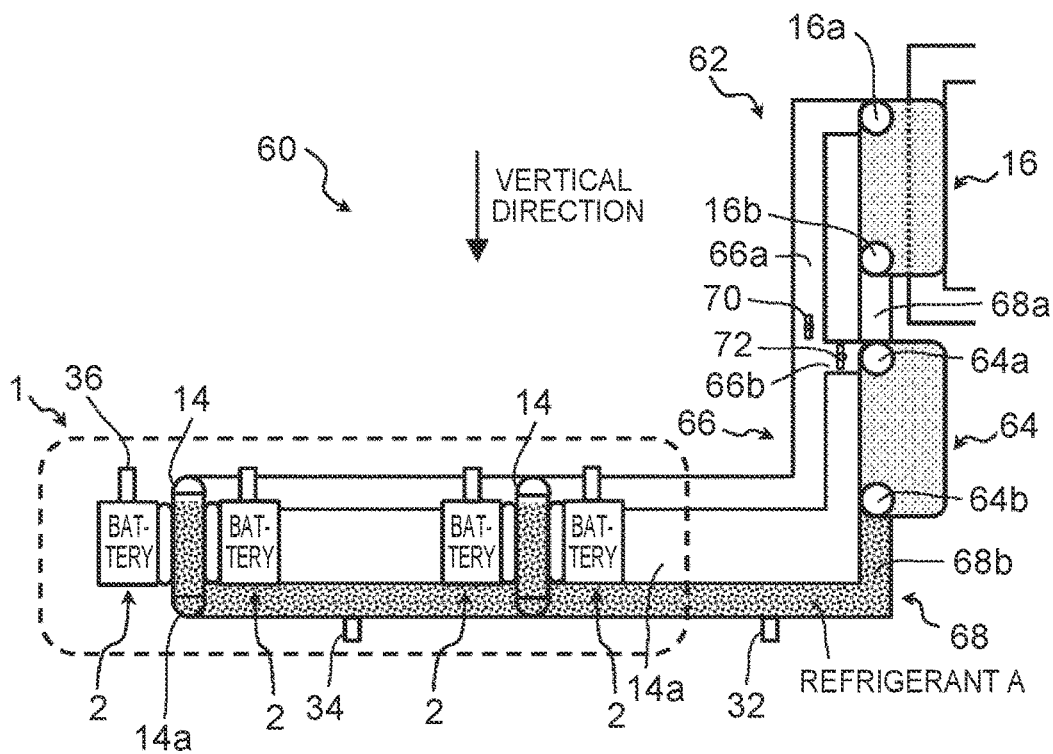
FIG. 10 is a diagram showing a schematic configuration of a battery cooling device according to a second embodiment.

FIG. 10 is a diagram showing a schematic configuration of a battery cooling device 60 according to a second embodiment. A battery cooling circuit 62 included in the battery cooling device 60 is different from the battery cooling circuit 12 according to the first embodiment in the following points.

Specifically, the battery cooling circuit 62 includes an air-cooled condenser 64 as well as the liquid-cooled condenser 16. That is, the condenser 64 is configured to exchange heat between the refrigerant A (battery cooling refrigerant) and the outside air. For the heat exchange, the condenser 64 may be configured to use the travel wind of the vehicle, or to use the blower fan (for example, an electric type) (not shown) instead of or together with the travel wind. The condensers 16 and 64 correspond to examples of the "first condenser" and the "second condenser" according to the present disclosure, respectively.

Further, as shown in FIG. 10, the air-cooled condenser 64 is disposed above the cooler 14 and below the condenser 16 in the vertical direction (more specifically, directly below the condenser 16).

Further, as shown in FIG. 10, the battery cooling circuit 62 includes a vapor passage 66 and a liquid passage 68. The vapor passage 66 branches toward vapor inlets 16a and 64a on the condensers 16 and 64 sides, respectively. The liquid passage 68 includes a portion 68a connecting a liquid outlet 16b and a liquid outlet 64b, and a portion 68b connecting the liquid outlet 64b and each cooler 14.

Then, the battery cooling circuit 62 is configured to be able to select a "non-bypass flow path state" in which the vapor phase refrigerant discharged from the cooler 14 passes through the condenser 16 and the condenser 64 in order, and a "bypass flow path state" in which the vapor phase refrigerant bypasses the condenser 16 and passes through the condenser 64. In order to realize such a function, as an example, the battery cooling circuit 62 includes a flow path switching valve 70 that opens and closes a branch passage 66a on the condenser 16 side and a flow path switching valve 72 that opens and closes a branch passage 66b on the condenser 64 side. According to such a configuration, the non-bypass flow path state can be obtained by opening the flow path switching valve 70 and closing the flow path switching valve 72. FIG. 10 shows the non-bypass flow path state. Then, the bypass flow path state can be obtained by closing the flow path switching valve 70 and opening the flow path switching valve 72.

Figure 11:
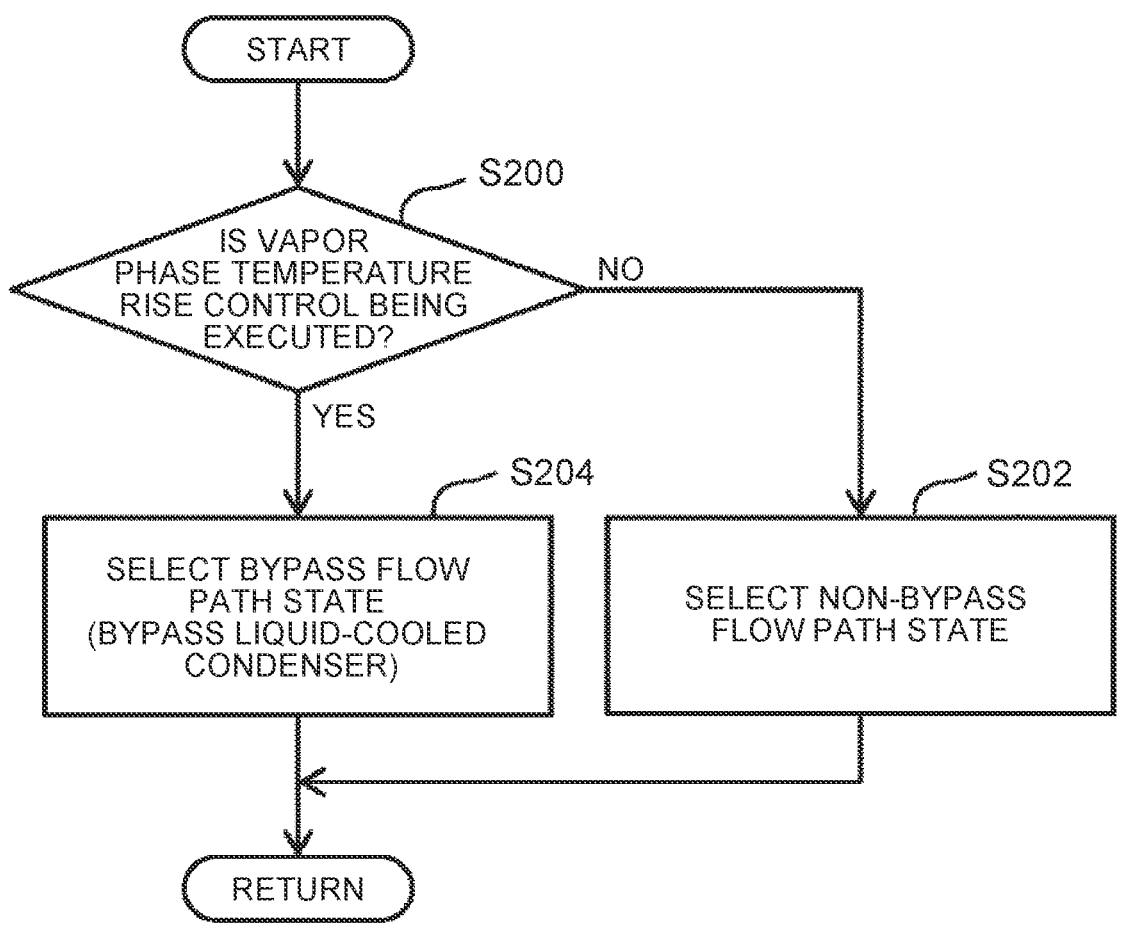
FIG. 11 is a flowchart showing a flow of a process related to flow path control around first and second condensers according to the second embodiment.

FIG. 11 is a flowchart showing a flow of a process related to flow path control around the condensers 16 and 64 according to the second embodiment. The process of this flowchart is executed in parallel with the process of the flowchart shown in FIG. 6 described above.

In FIG. 11, the ECU 30 first determines in step S200 whether the vapor phase temperature rise control is being executed. When the vapor phase temperature rise control is not being executed as a result, the process proceeds to step S202. In step S202, the ECU 30 opens the flow path switching valve 70 and closes the flow path switching valve 72 such that the non-bypass flow path state is selected.

On the other hand, when the ECU 30 determines in step S200 that the vapor phase temperature rise control is being executed, the process proceeds to step S204. In step S204, the ECU 30 closes the flow path switching valve 70 and opens the flow path switching valve 72 such that the bypass flow path state is selected.

As described above, in the battery cooling circuit 62 according to the second embodiment, the air-cooled condenser 64 is disposed below the liquid-cooled condenser 16 in the vertical direction. In the thermosiphon type battery cooling circuit 62, it is necessary to secure a height difference between the cooler 14 and the main condenser 16 for smooth circulation of the refrigerant A. Therefore, a space is created below the condenser 16. According to the battery cooling circuit 62, the sub condenser 64 can be disposed by effectively utilizing such a space. This makes it possible to mount the condensers 16 and 64 in two stages in such a manner as to save the space as compared with an example in which the condensers 16 and 64 are disposed side by side in the horizontal direction.

Further, in the second embodiment, the bypass flow path state is selected during the execution of the vapor phase temperature rise control. The vapor phase temperature rise control is executed under the high outside air temperature condition in which the circulation stop condition is satisfied. Therefore, the refrigerant A can be heated by using the high temperature outside air in the condenser 64. Thereby, the vapor phase temperature rise control can be executed while suppressing the energy consumption. In addition, in an example in which the blower fan is provided to promote heat exchange between the outside air and the refrigerant A in the condenser 64, the ECU 30 may operate the blower fan when the bypass flow path state is selected.

It should be noted that selecting the bypass flow path state and using only the condenser 64 may be executed not only during the execution of the vapor phase temperature rise control, for example, but also when battery cooling is required under at least one of a low heat generation amount condition in which the battery heat generation amount Q is low and a low outside air temperature condition. As a result, in a situation where high cooling capacity is not required, it is possible to cool the battery without operating the vehicle air conditioning device 24 and the fluid circulation circuit 26, so that energy saving can be achieved.

Next, a modification of the second embodiment will be described. That is, in order to obtain the effect of saving the space described above, the flow path switching valves 70 and 72 may not necessarily be provided as long as the condenser 64 is disposed below the condenser 16 in the vertical direction. Further, in order to obtain the effect of saving the energy described above, the condenser 64 is not necessarily disposed below the condenser 16 in the vertical direction as long as the battery cooling circuit is configured to be able to select the non-bypass flow path state and the bypass flow path state.

What is claimed is:

1. A battery cooling device mounted on a vehicle, the battery cooling device comprising:
    a thermosiphon type battery cooling circuit in which a battery cooling refrigerant is sealed and that includes
        one or more coolers that are configured to absorb heat generated by one or more battery cells and evaporate the battery cooling refrigerant in a liquid phase,
        one or more condensers that are disposed above the one or more coolers in a vertical direction of the vehicle and that are configured to condense the battery cooling refrigerant in a vapor phase,
        a vapor pipe that connects the one or more coolers with the one or more condensers, and the battery cooling refrigerant in the vapor phase flows through the vapor pipe to the one or more condensers, and
        a liquid pipe that connects the one or more condensers with the one or more coolers, and the battery cooling refrigerant in the liquid phase flows through the liquid pipe to the one or more coolers;
    a heat exchanger connected to, via a fluid circuit, the one or more condensers that are provided on the vapor pipe, and configured to heat or cool the battery cooling refrigerant; and
    a processor configured to
        determine, in a case where the processor receives a request for cooling the one or more battery cells, whether a circulation stop condition is satisfied based on temperatures of the one or more battery cells and an outside air temperature, the circuit stop condition being a condition in which there is a possibility that circulation of the battery cooling refrigerant is stopped in the battery cooling circuit,
        turn the heat exchanger on, and heat the vapor phase in the battery cooling circuit in a case where (i) the circulation stop condition is satisfied, (ii) the circulation of the battery cooling refrigerant is not started and (iii) a liquid surface level of the battery cooling refrigerant in the liquid phase is above a threshold, and
        turn the heat exchanger off and stop heating the vapor phase in the battery cooling circuit in a case where the liquid surface level falls below the threshold.

2. The battery cooling device according to claim 1, wherein the processor is configured to:
    in a case where the circuit stop condition is not satisfied, and in a case where a temperature of the battery cooling refrigerant is above a first target refrigerant temperature, cool the battery cooling refrigerant;
    in a case where the circuit stop condition is not satisfied, and in a case where the temperature of the battery cooling refrigerant falls below the first target refrigerant temperature, stop cooling the battery cooling refrigerant;
    in a case where (i) the circuit stop condition is satisfied, (ii) the circulation of the battery cooling refrigerant is not started, and (iii) the liquid surface level is below the threshold, cool the battery cooling refrigerant; and
    in a case where the circuit stop condition is satisfied, and in a case where the temperature of the battery cooling refrigerant falls below a second target refrigerant temperature, stop cooling the battery cooling refrigerant, the second target refrigerant temperature being higher than the first refrigerant temperature.

3. The battery cooling device according to claim 2, wherein in a case where the liquid surface level is above the threshold, the processor is configured to turn the heat exchanger on, and the heat exchanger is configured to heat the vapor phase in the battery cooling circuit.

4. The battery cooling device according to claim 1, wherein
    the battery cooling device further includes one or more heaters disposed on the vapor pipe of the battery cooling circuit and configured to heat the vapor phase in the battery cooling circuit when the heat exchanger heats the vapor pipe.

5. The battery cooling device according to claim 1, wherein:
    the heat exchanger is included in a vehicle air conditioning device mounted on the vehicle; and
    the one or more condensers include
        a first condenser that is configured to exchange heat between the battery cooling refrigerant and an air conditioning refrigerant flowing through the heat exchanger, or between the battery cooling refrigerant and a fluid that exchanges heat with the air conditioning refrigerant, and
        an air-cooled second condenser, wherein the second condenser is disposed below the first condenser in the vertical direction.

6. The battery cooling device according to claim 1, wherein
    the heat exchanger is included in a vehicle air conditioning device mounted on the vehicle, and
    the one or more condensers include
        a first condenser that is configured to exchange heat between the battery cooling refrigerant and an air conditioning refrigerant flowing through the heat exchanger, or between the battery cooling refrigerant and a fluid that exchanges heat with the air conditioning refrigerant, and an air-cooled second condenser, wherein:

the battery cooling circuit further includes a flow path switching valve with which a non-bypass flow path state in which the battery cooling refrigerant in the vapor phase discharged from the one or more coolers passes through the first condenser and the second condenser in order, and a bypass flow path state in which the battery cooling refrigerant in the vapor phase discharged from the one or more coolers bypasses the first condenser and passes through the second condenser are able to be selected; and the processor is configured to control the flow path switching valve such that the bypass flow path state is selected when the heat exchanger heats the vapor phase in the battery cooling.

* * * * *